United States Patent

Mansell

[15] 3,685,481
[45] Aug. 22, 1972

[54] FISHING BOAT

[72] Inventor: Gilbert G. Mansell, 205 E. Court St., Atoka, Okla. 74525

[22] Filed: Oct. 2, 1970

[21] Appl. No.: 77,650

[52] U.S. Cl. ..................................... 115/35, 115/18
[51] Int. Cl. .............................................. B63h 25/42
[58] Field of Search...115/35, 37, 41, 17, 18 R, 18 E, 115/18 A, 34

[56] References Cited

UNITED STATES PATENTS

| | | | |
|---|---|---|---|
| 3,587,512 | 6/1971 | Patterson | 115/37 |
| 3,324,821 | 6/1967 | Laughlin | 115/34 R |
| 2,633,817 | 4/1953 | Pedranti | 115/35 X |
| 2,877,733 | 3/1959 | Harris | 115/18 E |
| 2,429,774 | 10/1947 | Schultz et al. | 115/18 E X |
| 3,483,843 | 12/1969 | Hawthorne | 115/41 R |

Primary Examiner—Milton Buchler
Assistant Examiner—Carl A. Rutledge
Attorney—Dunlap, Laney, Hessin & Dougherty

[57] ABSTRACT

A fishing boat for use with an electrically powered fishing motor wherein the hull of the boat has an opening in the bottom thereof in proximity with the bow of the boat and a solid wall housing extends upwardly from the hull opening. The fishing motor is supported by the top of the solid wall housing in such a manner that the motor may be raised above the bottom of the hull into the well formed by the solid wall housing when the boat is being moved from one fishing location to another, and the fishing motor may be lowered into operating position and turned in any desired direction to maneuver the boat while the boat is being used for fishing.

4 Claims, 4 Drawing Figures

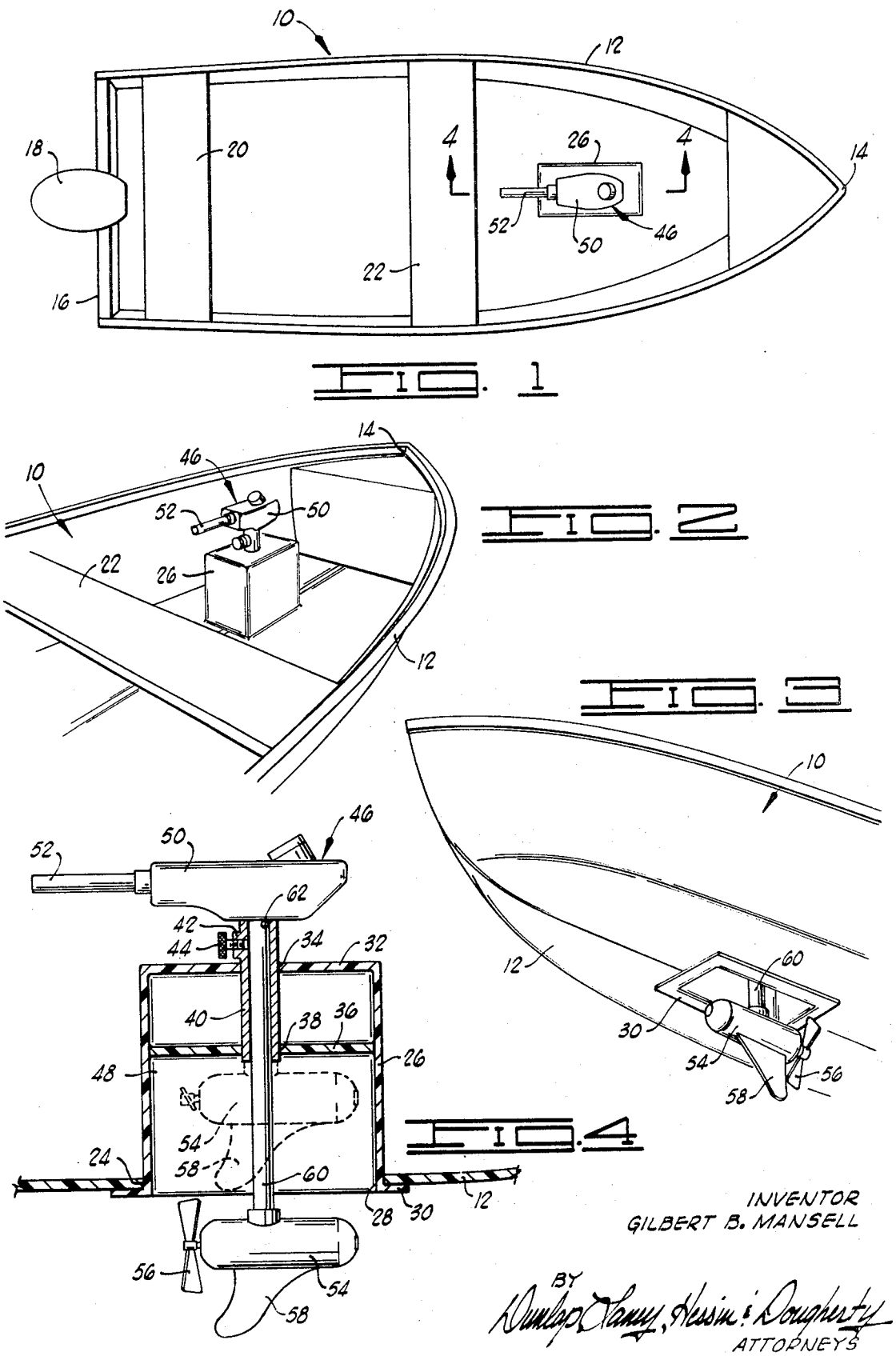

3,685,481

FISHING BOAT

BACKGROUND OF THE INVENTION

1. Field of the Invention

This invention relates to improvements in fishing boats used with electrically powered fishing motors.

2. Description of the Prior Art

Electrically powered fishing motors are normally mounted either on the stern or the bow of the boat. When mounted on the stern, the fishing motor is normally mounted to one side of the normal outboard motor used for propelling the boat from one fishing location to another, such that the operation of the fishing motor is inconvenient to the fisherman, the turning movement of the fishing motor for steering the boat is limited, and the fishing motor, not being on the centerline of the boat, makes it difficult to keep the boat on a predetermined course when the fishing motor is being used. When the fishing motor is mounted on the bow of the boat, a complicated and expensive rigging is required for steering the fishing motor by the fisherman while the fisherman is fishing, and a complicated mounting is required for moving the fishing motor from its operative to inoperative positions. Here again, the arc through which the fishing motor may be moved for steering is limited.

SUMMARY OF THE INVENTION

An object of this invention is to increase the utility of electrically powered fishing motors.

Another object of this invention is to provide a mounting for an electrically powered fishing motor whereby the fishing motor may be easily stored in an inoperative position while the boat is being moved from one fishing location to another, and the motor may be lowered to an operative position in an easy and convenient manner when the fishing location is reached.

A further object of this invention is to provide a mounting for a fishing motor such that the motor will be conveniently accessible to the fisherman and may be turned in any desired direction to maneuver the fishing boat in any desired direction.

A still further object of this invention is to provide a mounting for an electrically powered fishing motor whereby the fishing motor may be easily detached from the boat when the boat is stored.

Other objects and advantages of the invention will be evident from the following detailed description when read in conjunction with the accompanying drawing.

BRIEF DESCRIPTION OF THE DRAWING

FIG. 1 is a plan view of a fishing boat constructed in accordance with this invention and having an electrically powered fishing motor installed thereon.

FIG. 2 is a perspective view looking generally down on the bow portion of the fishing boat.

FIG. 3 is a perspective view looking generally upward at the bow portion of the fishing boat.

FIG. 4 is a sectional view as taken along lines 4—4 of FIG. 1, but with the fishing motor being shown in elevation for clarity of illustration.

DESCRIPTION OF THE PREFERRED EMBODIMENT

Referring to the drawings in detail, and particularly to FIG. 1, reference character 10 generally designates a fishing boat comprising a hull 12 of, for example, fiberglass construction, having a bow 14 and stern 16. A conventional outboard motor 18 is normally mounted on the stern of the hull and a seat 20 is normally provided adjacent the stern 16 for use by the operator of the outboard motor 18. The hull 12 also includes a seat 22 extending transversely across the medial portion of the hull.

As shown most clearly in FIGS. 3 and 4, a rectangular opening 24 is formed in the bottom of hull 12 along the longitudinal centerline of the hull between the bow 14 and stern 16, and preferably immediately forward of the seat 22 which will be closer to the bow 14 than the stern 16. A solid wall housing 26 having an opening 28 in the lower end thereof is positioned in the hull 12. The external transverse dimensions of the solid wall housing 26 correspond to the transverse dimensions of the hull opening 24 and the lower end of the housing 26 is extended through the hull opening 24. Flanges 30 extend outwardly at the lower end of the housing 26 and are sealed to the bottom of the hull 12 around the lower edge of the hull opening 24 by any suitable bonding agent. The top 32 of the housing 26 is closed except for an aperture 34 extending through the central portion thereof aligned with the center of the opening 28 at the lower end of the housing. Also, a reinforcing plate 36 is extended across the housing 26 somewhat closer to the top of the housing than the bottom of the housing and has an aperture 38 therein aligned with the aperture 34 in the top 32. A sleeve 40 is secured in the apertures 34 and 28 and projects a short distance, such as one inch, above the top 32. A boss 42 is preferably formed on the sleeve 40 to be positioned immediately above the top 32 of housing 26 and a set screw 44 is threaded through the boss 42 for purposes to be described.

The housing 26, reinforcing plate 36 and sleeve 40 are preferably formed of a reinforced fiberglass material to support an electrically powered fishing motor generally designated by reference character 46. Also, of course, the bonding agent used for sealingly securing the flanges 30 to the hull 12 must be of sufficient strength to support the housing 26 and the fishing motor 46. The housing 26 therefore forms what may be considered a permanent well 48 in the hull 12.

The fishing motor 46 may be of any desired construction. Such a fishing motor normally comprises an upper housing 50 having a handle 52 thereon and normally housing the controls for the motor. Such a fishing motor also normally includes a lower housing 54 containing the electric motor for driving the propeller 56 and having a fin 58 on the bottom surface thereof. The upper housing 50 and lower housing 54 are interconnected by a shaft or tube 60 and the shaft 60 is normally removably connected to the upper housing 50 by a roll pin 62 or the like, such that the fishing motor may be easily disassembled.

In accordance with the present invention, the internal transverse dimensions of the housing 26 below the plate 36, and the transverse dimensions of the opening 28 in the lower end of the housing are larger than the transverse dimensions of the lower fishing motor housing 54, including the propeller 56. Also, the sleeve 40 is of a size to slidingly receive the shaft 60 of the fishing motor.

OPERATION

The solid wall housing 26 is, or course, a permanent part of the hull 12. When the fishing boat 10 is being readied for fishing, the fishing motor 46 is installed in the housing 26 by inserting the shaft 60 upwardly through the sleeve 40 and then attaching the shaft 60 to the upper housing 50 by the roll pin 62. The motor 46 is then raised until the lower housing 54 is contained within the well 48 as illustrated in dashed lines in FIG. 4; whereupon the set screw 44 is tightened to engage the shaft 60 and hold the motor 46 in such raised position.

The boat 10 may then be propelled by the usual outboard motor 18 to the desired fishing location. During such an operation it should be noted that the fishing motor 46 will be inoperative and the lower housing 54 will be raised above the bottom of the hull 12 and present no drag to the movement of the boat. It may also be noted that since the housing 26 is of solid wall construction and sealed at its lower end to the hull 12, no water will enter the hull outside of the well 48. Also, it is preferred that the plate 36 and top 32 of the housing 26 be located above the highest anticipated water line on the hull 12 to minimize the possibility of water flowing or splashing through the sleeve 40 when the boat is launched.

When the fishing boat is moved to the desired fishing location, the outboard motor 18 is stopped and the set screw 44 loosened; whereupon the fishing motor 46 is lowered to the position shown in full lines in FIG. 4 where it will be noted that the lower fishing motor housing 54 is positioned below the bottom of the hull 12. A fisherman sitting on the seat 22 may then operate the fishing motor 46 easily and conveniently from his fishing position. The handle 52 of the fishing motor is readily accessible to the fisherman. Further, since the shaft 60 of the fishing motor is slidably disposed in the sleeve 40, the fishing motor may be turned at any desired angle through 360°, such that the boat 10 may be maneuvered in any desired direction for the convenience of the fisherman. During use of the fishing motor 46, the upper housing 50 will normally rest on the upper end of the sleeve 40 to properly position the lower housing 54 as shown in full lines in FIG. 4.

It is believed apparent that the invention attains the objects heretofore set forth.

Changes may be made in the combination and arrangement of parts or elements as heretofore set forth in the specification and shown in the drawing without departing from the spirit and scope of the invention as defined in the following claims.

What is claimed is:

1. A fishing boat for use with an electrically powered fishing motor having an upper housing and a lower housing interconnected by a shaft, comprising:

a boat hull having an opening in the bottom thereof between the stern and the bow of the hull along the centerline of the hull, said opening having transverse dimensions larger than the transverse dimensions of the fishing motor lower housing;

a solid wall housing in the hull of a size to receive the fishing motor lower housing and having an upper end and a lower end, said lower end having an opening therein mating with said hull opening and having transverse dimensions larger than the transverse dimensions of the fishing motor lower housing, said housing also having an aperture in the upper end thereof aligned with said openings of a size to slidingly receive the fishing motor shaft, whereby when the fishing motor shaft is extended through said aperture with the fishing motor upper housing above the solid wall housing the fishing motor lower housing may be stored in the solid wall housing, and alternately, lowered below the hull and turned through 360° for steering the boat in any direction;

a reinforcing plate secured across the solid wall housing having an aperture therein aligned with the aperture in the upper end of the solid wall housing;

a sleeve secured in said apertures and projecting above the upper end of the solid wall housing and being sized to slidingly receive the fishing motor shaft;

a set screw secured transversely in the sleeve in a position to engage the fishing motor shaft and support the fishing motor in the desired vertical position; and means for sealing the lower end of the solid wall housing to the hull around the hull opening.

2. A fishing boat as defined in claim 1 wherein the solid wall housing and the reinforcing plate are formed of reinforced fiberglass, and said means for sealing the lower end of the solid wall housing to the hull comprises flanges formed around the lower end of the solid wall housing and a bonding agent securing the flanges to the hull.

3. A fishing boat as defined in claim 2 wherein the flanges are secured to the bottom of the hull around the lower edge of the hull opening.

4. A fishing boat as defined in claim 1 wherein the hull opening is closer to the bow than the stern.

* * * * *